United States Patent [19]

Knapp

[11] Patent Number: 4,804,011
[45] Date of Patent: Feb. 14, 1989

[54] CARTRIDGE WITH SEPARATE BOTTOM FOR A MIXING VALVE

[75] Inventor: Alfons Knapp, Biberach/Riss, Fed. Rep. of Germany

[73] Assignee: Masco Corporation, Taylor, Mich.

[21] Appl. No.: 54,580

[22] PCT Filed: May 30, 1986

[86] PCT No.: PCT/US86/01180
§ 371 Date: Jun. 1, 1987
§ 102(e) Date: Jun. 1, 1987

[87] PCT Pub. No.: WO86/07431
PCT Pub. Date: Dec. 18, 1986

[30] Foreign Application Priority Data
Jun. 13, 1985 [IT] Italy .................. 67555 A/85

[51] Int. Cl.4 ............................................. F16K 11/06
[52] U.S. Cl. .................................. 137/270; 137/625.4; 137/636.2
[58] Field of Search ............. 137/625.4, 625.41, 636.2, 137/270, 636.3

[56] References Cited

U.S. PATENT DOCUMENTS

| | | | |
|---|---|---|---|
| 4,005,728 | 2/1977 | Thorp | 137/270 |
| 4,325,403 | 4/1982 | Uhlmann . | |
| 4,378,029 | 3/1983 | Parkison . | |
| 4,425,935 | 1/1984 | Gonzalez . | |
| 4,557,288 | 12/1985 | Botnick . | |
| 4,584,723 | 4/1986 | Hussauf . | |
| 4,596,376 | 6/1986 | Knapp | 137/625.4 X |
| 4,610,268 | 9/1986 | Knapp | 137/625.4 X |

FOREIGN PATENT DOCUMENTS 0119960 6/1984 European Pat. Off. .

Primary Examiner—Alan Cohan
Attorney, Agent, or Firm—Steven L. Permut; Malcolm L. Sutherland

[57] ABSTRACT

A cartridge is receivable in a mixing valve body for regulating the flow rate and the mixing proportions of the liquid from two supply inlets. The cartridge includes a shell housing, an operating mechanism, and a movable valve element of hard material. The cartridge can be standardized to fit different kinds of mixing valve bodies. A separate bottom, built separately from the shell, mounts a fixed valve plate of hard material and includes at least the main parts distinguishing the cartridges assigned to different kinds of mixing valve bodies. A joint mechanism allows the mounting of the bottom onto the shell in selected positions so that the shell and bottom are resistant against separation from a pulling force. Preferably the joint, foreseen between the shell and the bottom of the cartridge, is a bayonet-type joint that fixes the shell and bottom against rotation but allows limited axial movement between the shell and the bottom.

10 Claims, 1 Drawing Sheet

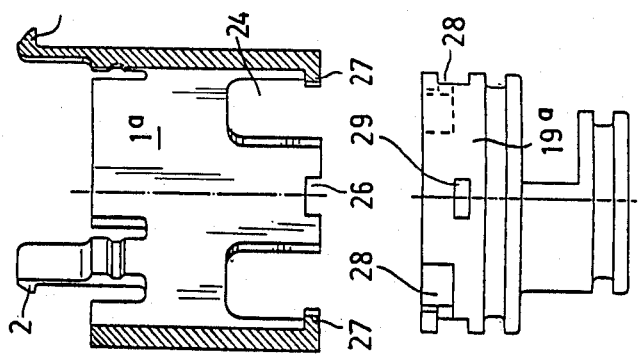
FIG. 3
FIG. 4
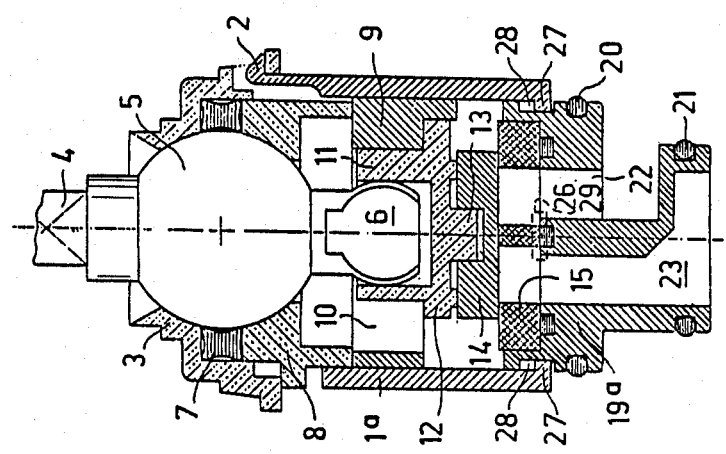
FIG. 2
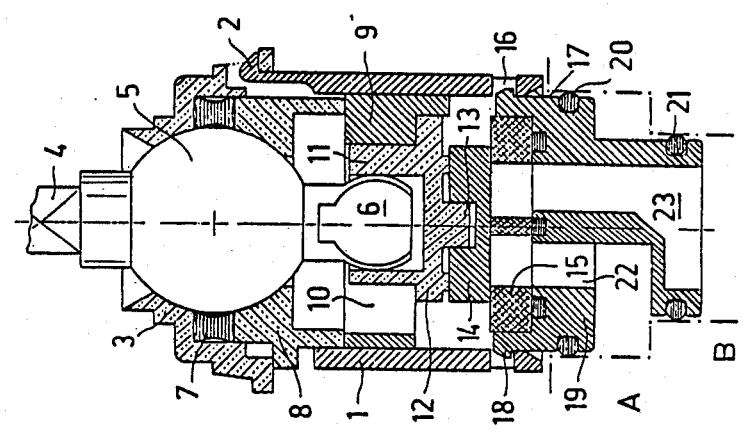
FIG. 1

4,804,011

CARTRIDGE WITH SEPARATE BOTTOM FOR A MIXING VALVE

TECHNICAL FIELD

The present invention deals with a cartridge to be introduced into the body of a mixing valve faucet so as to regulate the water flow rate and the mixing proportions of the liquid from two supply inlets in the faucet. The cartridge has a shell, a bottom, a fixed valve seat of hard material mounted in the bottom, an operating mechanism within the shell, and at least a movable valve plate connected to the operating mechanism to cooperate with the fixed valve seat.

BACKGROUND OF THE INVENTION

Many kinds of mixing valves are distinguishable because of their water flow rate, the kind of valve plates used for the regulation of liquid flow, the arrangement of the supply lines and spout outlet, the optional placement of divertors, or the presence of other particular characteristics as required by the laws or regulations of some particular countries. Furthermore, the same mixing valve can behave differently depending on how it is connected to the supply lines if the cartridge is not correspondingly modified.

Up to now there has been the necessity to produce many different cartridges, each one particularly suited to different kinds of mixing valves or to particular installation conditions although the shell, operating mechanism, and other components are not substantially different in different models and are theoretically susceptible to standard construction. The production of many kinds of cartridges, which are different only because of some minor details, causes a cost increase in production, inventory and distribution and causes the plumbers to be supplied with different kinds of cartridges and the risk in choosing from the various cartridges.

SUMMARY OF THE INVENTION

It is desirable to find a remedy to the aforesaid problem by standardizing a cartridge for different kinds of mixing valves or for different installation conditions. Consequently, reductions of the production and storage costs and better industrial organization of the production, storage and distribution of the cartridge are possible.

It is also desirable to make a standard cartridge available for installation in different kinds of mixing valves or in different installation conditions.

Standardization can be achieved, according to this invention, through a cartridge characterized by a shell that is built in a substantially standard form that is adequate for different kinds of mixing valves and for different installation conditions. The operating mechanism is housed in the shell. The bottom is built separately from the shell and bears at least the main parts intended to distinguish the cartridges assigned to different kinds of mixing valve bodies or to different installation conditions. A joint between the shell and the bottom allows the cartridge shell to be joined to different bottoms or the bottom to be mounted in different positions and the joint is constructed to resist pulling without disconnection of the bottom from the shell. The joint can be formed to allow mounting of the bottom to the shell in more than one position.

Due to these characteristics, the main and most expensive bulky part of the cartridge can easily be of only one standard model to form the cartridges assigned to many kinds of mixing valves and to different installation conditions. The distinguishing elements, diversifying the cartridges assigned to different kinds of mixing valves or to different installation conditions, are in the separate bottom member.

The separate bottom does not cause any trouble as its own joining devices are not releasable through a simple pull. This way, the whole cartridge along with the bottom can always be removed from the mixing valve body, where it was seated without the bottom being accidentally retained in the body because of the holding seals, incidental adhesions or the like.

The cartridge can have a joint arranged between the shell and the cartridge bottom so that the bottom can be mounted to the shell without separate tools. Due to this characteristic, the standardized part of the cartridge and the distinguishing bottom can be separately supplied to the plumber and can be easily joined when it is necessary by connecting a standard shell containing the operating mechanism with the bottom required by the particular installation or with the same bottom in a particular position required by the installation. Preferably the joint is a bayonet-type to fix the bottom of the cartridge to the shell in one or more specific angular positions. Due to this characteristic, the cartridge can also be premounted with its own standard bottom that is most frequently used or placed in the generally used position and, when it is necessary, the bottom can be easily removed by a plumber and remounted into a different position or replaced by a different bottom.

BRIEF DESCRIPTION OF THE DRAWINGS

Reference is now made to the accompanying drawings in which:

FIG. 1 shows a segmented side elevational view of a cartridge for a mixing valve having a separately constructed bottom which can be snap fitted in place without using any tools;

FIG. 2 shows a view similar to FIG. 1 of a second embodiment of a cartridge where the bottom is constructed to be easily released and remounted;

FIG. 3 shows a part of the cartridge shell according to FIG. 2 with part of the joint clearly shown as an integral part of the shell; and FIG. 4 shows the side elevational view of the cartridge bottom according to FIG. 2.

DETAILED DESCRIPTION OF THE PREFERRED EMBODIMENTS

The cartridge, according to FIG. 1, consists of a shell formed by a substantially cylindrical part 1 which is connected through release teeth 2 to an upper cap 3. The cap forms the upper half bearing for an articulation ball 5 which is provided on the external side with an arm 4 appointed to be connected with an operating lever (not shown) of the mixing valve and on the inner side with a flat key 6, appointed to transmit to the inner components of the cartridge some controlled translational and rotational movement through the arm 4 by the operating lever. The ball 5 sits on a lower half bearing 8 received into the cylindrical part 1 of the cartridge shell. A seal 7 is introduced around the ball 5 between the half bearings 3 and 8. Under the half bearing 8 in the cylindrical part 1 of the cartridge shell a control ring 9 is swivel mounted for a limited angle. The control ring 9 has a diametral slot 10. A head 11 of a slide member 12 is positioned in the slot 10 to slide therein. The head 11 has a rectangular cavity that receives the flat key 6 connected to the ball 5. The slide member 12 has a downwardly depending relief 13 to be connected to a movable valve plate 14 of hard material. The valve plate 14 can therefore be rotated and translationally moved by operation of ball 5 in the operating lever.

A separate bottom member 19 of the cartridge mounts a fixed valve plate 15 of hard material that cooperates with the movable valve plate 14 to regulate the water flow rate and the mixing ratio of the liquids supplied to the mixing valve. The bottom member 19 is built as a separate member and is mounted to the cover by a joining mechanism 16, 18 which, in this case, consists of windows 16 presented by the shell 1 and teeth 18 presented by the bottom 19.

The parts of the shell 1 having the windows or the parts of the bottom 19 having the extending teeth, have a resiliency to be snap fitted together. The bottom 19 can be fixed to the cartridge shell 1 by simply introducing it and pressing it against its lower extremity so that the teeth 18 are released into the windows 16 of the shell 1. To make this operation easier, the lower extremity of the shell can have a chamfered surface 17.

Although the mounting operation of the bottom 19 is very easy, a pulling force on the bottom cannot disconnect it from the cartridge. This guarantees that the cartridge can be taken out from the mixing valve body carrying with it the bottom 19 even if the bottom 19 is frictionally held in the body, for example, by the friction of the circumferential seals 20 and 21 in corresponding borings A and B of the faucet bottom. In this fashion, a bottom of any model suitable to every kind of mixing valve can be mounted to a standard shell 1-3 of the cartridge containing standard components 4-14.

When desired, the bottom can be mounted in different positions according to the necessities of the installation. The bottom 19 has two inlets 22 and 23 corresponding to two passages through the fixed plate 15. The first inlet 22 ends laterally between the two seals 20 and 21 and it receives the water supplied to the boring A of the mixing valve body while the second pipe 23 ends under the lower seal 21 and therefore it receives the water supplied to the boring B of the mixing valve body. If the bottom 19 is applied in the position shown in FIG. 1, the water supplied at the boring A is directed to the left passage (according to FIG. 1) of the fixed valve plate 15, and therefore it can be delivered by shifting the lever 4 to the left while the water supplied at the boring B is directed to the right passage (according to FIG. 1) of the fixed valve plate 15 and therefore it can be delivered by shifting the lever to the right. Water flows into the shell and through outlets 24.

If we mount the bottom 19 in a position with a 180° rotation in comparison to the one shown in FIG. 1 to a position as shown in FIG. 2, it turns out that the water supplied to the boring A is directed to the right passage of the fixed valve plate 15 and therefore it can be delivered by shifting the lever 4 to the right, while the water supplied to the boring B is directed to the left passage of the fixed valve plate 15, and it can be therefore delivered by shifting the lever 4 to the left.

The two different possible assembly positions of the bottom 19 provide a similar operation of the valve relative to the operation carried out by the consumer by two different mixing valve faucets having inverted connections where water flows into the mixing body. Inversion often occurs when some mixing valves are mounted on the opposite sides of a common wall. The two vertical supply pipes of hot and cold water within the wall are in a position reciprocally inverted to the two mixing valve faucets. The plumber is able to mount the bottom 19 into the shell 1 during the installation by choosing its assembly position to achieve the correct behavior of the mixing valves placed on both sides of the common wall.

On occasion, the two possible assembly positions of the bottom 19 can be more than two and the angle of the shifts from one position to the next one can be preselected at positions other than at 180° or at its submultiples.

In other cases, the plumber will instead select among the available different bottoms 19 for the particular necessities of the current installation and will apply this particular bottom, in the opportune position, to the cartridge shell 1.

With the embodiment according to FIG. 1, disassembly of the bottom 19, after being applied to the cartridge shell 1, can be impossible or at least uneasy due to the snap fitting feature of the joint 16-18. Therefore, the bottom 19 must be supplied separately from the remainder of the cartridge contained in the shell 1 to allow the plumber to choose them or to easily position them. In certain cases, it may be more advantageous that the bottom, after being applied to the cartridge, can still be easily released or disassembled from the rest of the cartridge. This provides for reassembly in a different position or replacement by a different bottom.

In the embodiment according to FIGS. 2-4, the joint mechanism provided at the lower extremity of the cartridge shell 1a, consists of clutch prongs 27 and recesses 26. Correspondingly, the bottom 19a has some bayonet slots 28 and clutch lugs 29. These parts are so placed that the prongs 27 of the shell 1a can be received into the bayonet slots 28 of the bottom 19a without the lugs 29 preventing the necessary rotation of the parts. Further axial movement of the bottom 19a has the lugs 29 of the bottom 19a being received in the recesses 26 of the shell 1a to prevent further rotation.

As described in the first case, the bottom 19a can be mounted by choosing the position or an adequate bottom can be chosen among available different bottoms. When a cartridge comprising the shell 1a, its internal components, and the bottom 19a is received into the mixing valve body, the lugs 29 are necessarily engaged in the recesses 26 and guarantee that the bottom 19a and the fixed valve plate it seats cannot rotate with respect to the cartridge, therefore keeping the angular position necessary for a correct working.

On the other hand, if the cartridge is extracted by the mixing valve body, the lugs 29 are disconnected from the recesses 26 as a consequence to the exerting pull, but the bayonet joint of prongs 27 and slots 28 remain engaged and guarantee that the bottom 19a is extracted from the mixing valve body together with the cartridge.

The bottom 19a is then ready to be, if necessary, shifted or replaced against disconnection of the bayonet joint 27, 28 through rotation and the separation of the components 1a and 19a.

As a variation to the joint mechanism shown in FIGS. 2-4, the shell 1a could have only some prongs 27 and the bayonet slots 28 of the bottom 19a could have a zigzag course. In this case, the same prongs 27, engaging in the recesses of the bayonet slits could prevent further rotation of the member. The recesses 26 and the lugs 29 can therefore be eliminated.

In the embodiment according to FIG. 2, the possible assembly positions of the bottom 19a in the shell can be shifted at any desired angle. In the case of either FIG. 1 or FIGS. 2-4, the bottom 19, 19a in the shell 1, 1a, an adequate axial mobility can be possible so as to transmit a compressive force to the inner parts of the cartridge when it is required. In the shown embodiments, the bottom transfers onto the plates of hard material a compressive force resulting from the pressure of the water supplied at the mixing borings A and B. The invention can be applied to mixing valves using any kinds of plates of hard material which can be both (or only one) crossed by some passages. The plates may include some return passages for mixed water. The present invention may be also applied to mixing valves using more than two plates of hard material.

Variations and modifications of the present invention are possible without departing from the scope and spirit as defined in the appended claims.

I claim:

1. A cartridge for a mixing valve faucet that regulates the flow rate and mixing proportions of liquid from two supply inlets to said faucet, said cartridge characterized by:
   a main shell;
   an operating mechanism mounted to said shell;
   a movable valve element operably connected to said operating mechanism:
   a separate bottom member mounted to said shell;
   said bottom mounting a fixed valve seat to cooperate with said movable valve element;
   a joint means for mounting said bottom to said shell and being resistant against separation of the bottom and shell by pulling alone;
   said joint means positioned and cooperating with said shell and bottom to mount said bottom to said shell in at least two rotated positions;
   said joint means being constructed to mount said bottom in two different rotated positions to cause the communication of said supply inlets to be inverted with said fixed valve seat at said respective two positions.

2. A cartridge as defined in claim 1 further characterized by:
   said joint means being integrally incorporated in the shell and bottom and constructed to mount said bottom to said shell free from any separate tools.

3. A cartridge as defined in claim 2 further characterized by:
   said joint means including teeth extending from one of said shell and bottom and engaging edges in the other of said shell and bottom;
   said teeth being resilient in nature to snap fit onto said edge.

4. A cartridge as defined in claim 3 wherein said other of said shell and bottom has a surface leading up to said edge that is chamfered to provide easy mounting by said joint means.

5. A cartridge as defined in claim 2 wherein said joint means includes a bayonet-type joint with complementary prongs on one of said shell and bottom and slots on said other of said shell and bottom;
   means for fixing said shell and bottom from rotating relative to each other.

6. A cartridge as defined in claim 5 wherein said means for fixing includes complementary lug and slot on said shell and bottom that engage after said bayonet joint is engaged.

7. A cartridge as defined in claim 5 wherein said means for fixing includes said slots having axially extending recessed sections that axially receive said prongs.

8. A cartridge as defined in claim 1 further characterized by:
   said joint means allowing limited axial movement between said shell and bottom when said bottom is mounted to said shell.

9. A cartridge as defined in claim 8 wherein said bottom positionable in said mixing valve faucet to be responsive to pressure from said supply inlets to provide a compressive force between said fixed valve seat and movable valve element.

10. A cartridge for a mixing valve faucet that regulates the flow rate and mixing proportions of liquid from two supply inlets to said faucet, said cartridge characterized by:
    an operating mechanism including an articulating ball member having an operating arm and extending key element;
    a valve slide member receiving said key element;
    a movable valve element connected to said valve slide member;
    a control ring having a window that receives said valve slide member;
    a lower half bearing for abutting said articulating ball member;
    a shell for housing said movable valve element, valve slide member, control ring, lower half bearing and articulating ball member;
    said shell includes an upper cap member forming an upper half bearing for said articulating ball member and a tubular member connected to said cap member;
    a separate bottom member including a fixed valve seat for cooperating with said movable valve element; and
    a joint means for mounting said separate bottom to said tubular member and being resistant against pulling on said bottom or shell.

* * * * *